United States Patent [19]
Pandjiris et al.

[11] 3,802,277
[45] Apr. 9, 1974

[54] COMBINED HEADSTOCK, TURNTABLE, ROTATING DRIVER AND POSITIONER

[75] Inventors: Anthony K. Pandjiris, St. Louis; Arthur I. Frederick, Webster Groves; Walter Schledorn, Rock Hill, all of Mo.

[73] Assignee: The Pandjiris Weldment Co., St. Louis, Mo.

[22] Filed: June 19, 1972

[21] Appl. No.: 264,027

[52] U.S. Cl. .................................................. 74/16
[51] Int. Cl. .......................................... F16m 11/10
[58] Field of Search ........................... 74/16; 29/560

[56] References Cited
UNITED STATES PATENTS

| 2,889,910 | 5/1959 | Williamson, Jr. | 74/16 |
| 2,623,269 | 12/1952 | Goldschmidt | 29/560 |
| 2,514,857 | 7/1950 | Gottbreht | 74/16 X |
| 2,585,313 | 2/1952 | Hart | 74/16 X |

Primary Examiner—Benjamin W. Wyche
Assistant Examiner—F. D. Shoemaker

[57] ABSTRACT

A device that can be utilized selectively as either a headstock, turntable, rotating driver or positioner. The device includes a first unit having a power mechanism carried by a casing, and a table attached to and rotatable with a shaft of the power means, and a second unit having a pivot for connecting the casing to a stand for selectively pivoting the casing and hence the table to different angular positions, and a stop interconnecting the stand and casing to maintain the table in predetermined angular positions. The stop includes a plurality of holes in the stand arranged in an arc about the pivot means, a compatible hole in the casing alignable with the stand holes upon pivoting of the casing, and a fastener selectively disposed in aligned casing and stand holes to maintain the casing and hence the table in a predetermined angular position. The casing of the first unit is selectively detachable from the stand so as to rest on its own base for independent use of the first unit as a headstock or turntable or rotating driver, and selectively attachable to the stand for use also as a positioner.

2 Claims, 8 Drawing Figures

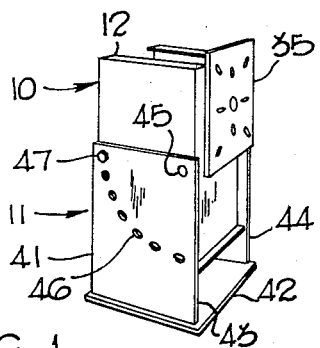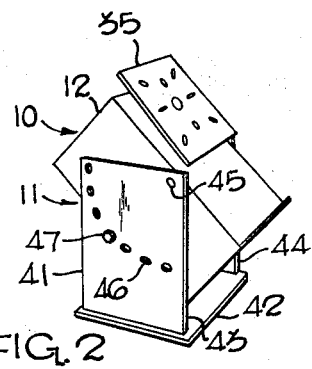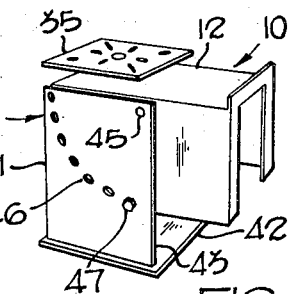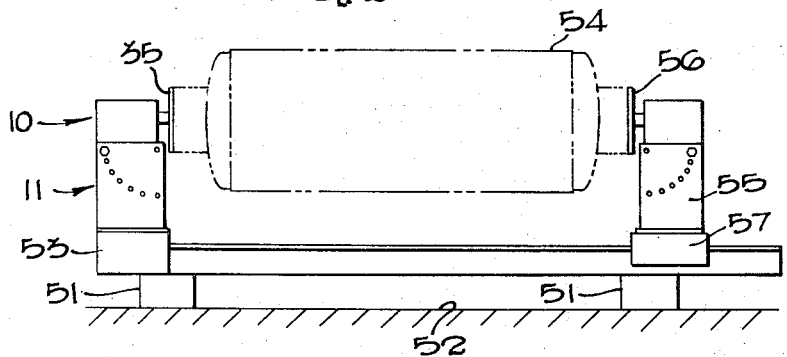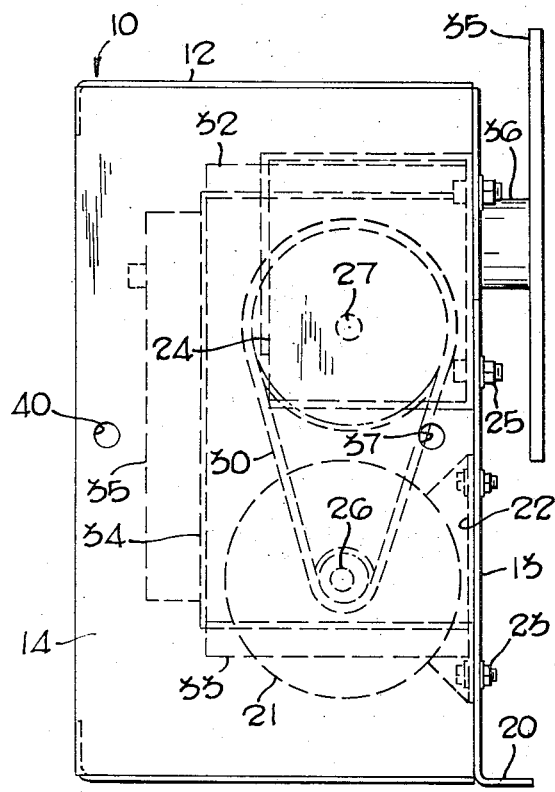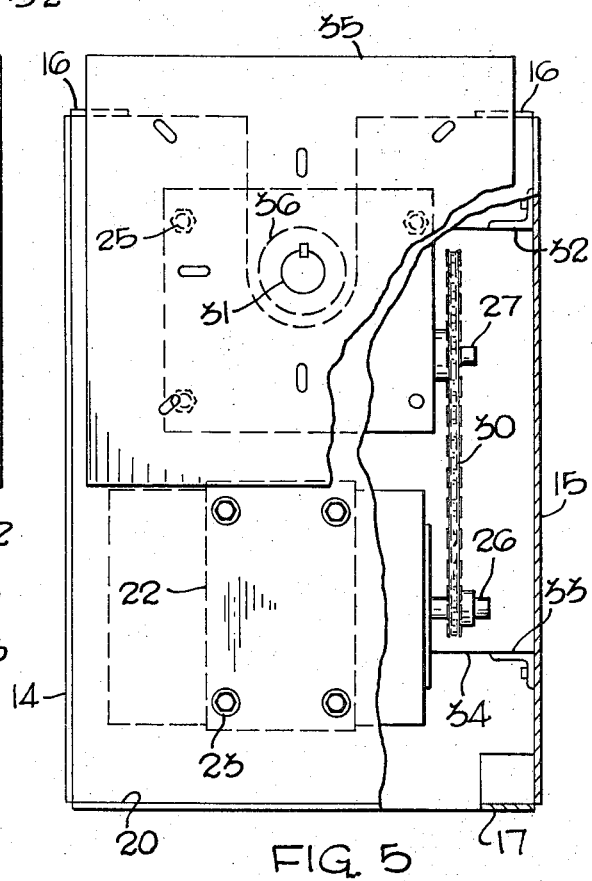

COMBINED HEADSTOCK, TURNTABLE, ROTATING DRIVER AND POSITIONER

BACKGROUND OF THE INVENTION

This invention relates generally to a device for rotating workpieces or another machine, and more particularly to a device that can be utilized selectively as either a headstock, turntable, rotating driver or positioner.

In prior known positioners of the type utilized for turning workpieces during fabrication as by welding, the power mechanism is separate and is attached to the positioner frame rather than being included and contained within a casing pivotally mounted to the frame. As a result, the casing cannot be and is not adapted to be selectively detachable from its supporting stand for use separately as a headstock, turntable or rotating driver.

SUMMARY OF THE INVENTION

The present invention provides a device that can be conveniently utilized as either a headstock, turntable, rotating driver or positioner. The power mechanism is carried by a casing that is selectively pivotally attached to a supporting stand. This structure enables the casing and rotating table to be used separately as a headstock or turntable or rotating device, and selectively enables the attachment of the casing to the stand for use as an angularly adjustable positioner.

The present device includes a first unit having a power means carried by a casing, and a table attached to and rotatable by a shaft of the power means, and includes a second unit having a pivot means selectively connecting the casing to a stand for selectively pivoting the casing and hence the table to different angular positions, and a stop interconnecting the stand and casing to maintain the table at predetermined angular positions.

The stop means includes a plurality of spaced holes in the stand arranged in an arc about the pivot means, a compatible hole in the casing alignable with the stand holes upon pivoting of the casing, and a fastener selectively disposed in aligned casing and span holes to maintain the casing and hence the table in a predetermined angular position.

The stand of the second unit includes a base and laterally spaced walls, the casing being disposed between the spaced walls and the pivot means interconnecting the casing to the spaced stand walls.

The power means includes a motor and a speed reducer located internally of the shaft, the speed reducer being operatively connected to the motor and the driven shaft.

The casing of the first unit is selectively detachable from the stand so as to rest on its own base for independent use as a headstock or a turntable or rotating driver, and is selectively attachable to the stand for use also as a positioner.

The power means is carried solely by the casing of the first unit to enable the independent use of the first unit as the headstock, turntable or rotating driver when selectively detached from the second unit.

BRIEF DESCRIPTION OF THE DRAWINGS

FIGS. 1 through 3 are perspective views illustrating the use of the device as a manipulator, the table being located in different angular positions. FIG. 1 further illustrates the use of the device as a headstock, and FIG. 3 further indicates the use of the device as a turntable.

FIG. 4 is a side elevational view of the first unit of the device showing its use separately from the second unit;

FIG. 5 is a front elevational view, partially broken away and shown in cross section, of the first unit of the device illustrated in FIG. 4;

FIG. 6 is a side elevational view illustrating the device in a welding lathe for turning cylinders or tanks;

DESCRIPTION OF THE PREFERRED EMBODIMENT

Figures 7, 8:
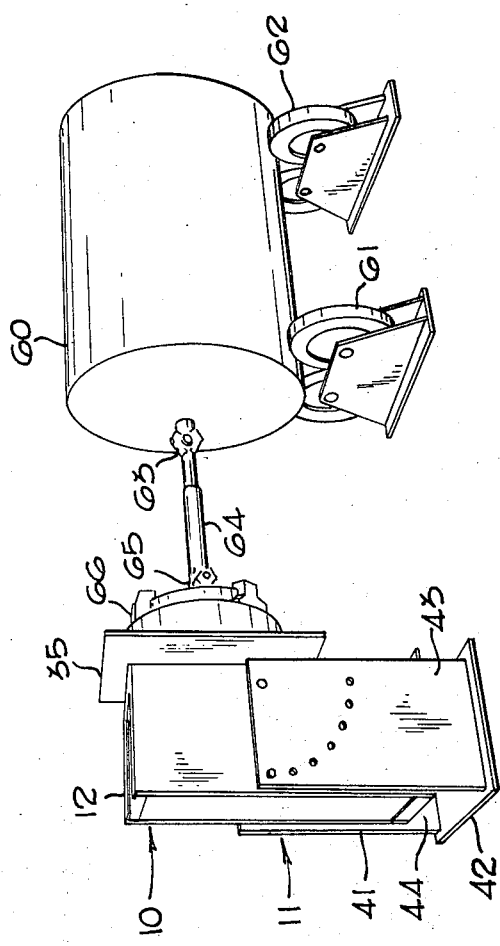
FIG. 7 is a perspective view showing the device as a rotating driver.
FIG. 8 is a top plan view illustrating the use of the device as a machine driver.

Referring now by characters of reference to the drawing, and first to FIGS. 1 through 3, it is seen that the device includes a first unit referred to by 10 pivotally mounted on a second unit referred to by 11. The different angular positions of the first unit 10 in FIGS. 1 through 3 illustrate the use of the device as a positioner for holding a workpiece in different angular positions. In addition, FIG. 1 illustrates the use of the device as a headstock or rotating driver, and FIG. 3 illustrates the use of the device as a turntable.

As more clearly shown in FIGS. 4 and 5, the first unit 10 includes a casing 12 having a front wall 13, spaced side walls 14 and 15. The side walls 14 and 15 are provided with inturned top flanges 16 which are laterally spaced to provide access to the compartment therebetween. Similar flanges 17 are provided at the bottom of the side walls 14 and 15. The front wall 13 includes a forwardly extending base flange 20 that cooperates with the inturned bottom flanges 17 to provide a supporting base for the casing 12.

The power means for the device includes an electric motor 21 located in the casing 12 between the side walls 14 and 15 and behind the front wall 13. The motor 21 has a base 22 fixed to the front wall 13 by a plurality of nuts and bolts 23. A speed reducer 24 is located in the casing 12 between the side walls 14 and 15 and behind the front wall 13, and located above the motor 21. The speed reducer 24 is secured to the front wall 13 by a plurality of bolts and nuts 25. The motor 21 includes a drive shaft 26 and the speed reducer 24 includes an input shaft 27, the shafts 26 and 27 being operatively interconnected by a sprocket and chain drive 30. The speed reducer 24 includes an output or driven shaft 31 extending forwardly of and through the front casing wall 13.

A pair of angles 32 and 33 are attached to each of the side walls 14 and 15, the angles 32 and 33 being disposed horizontally and being vertically spaced. Extending between and secured to the rear ends of the channels 32 and 33 is a back panel 34 that covers the rear side of the motor 21, speed reducer 24 and the sprocket and chain drive 30. Attached to and carried by the back panel 34 is the control box 35 containing the control mechanisms and connections for the device.

A table 35 is drivingly attached by its hub 36 to the driven shaft 31 so as to rotate therewith. The table 35 is adapted to hold and support a workpiece or a chuck or some other mechanism to be rotated or driven. In one limit position, the table 35 is disposed in a plane that is substantially perpendicular to the surface on which the unit 10 is supported by the casing base.

As is best seen in FIG. 4, the casing side walls 14 and 15 are provided with a hole 37 substantially near the front wall 13. Another hole 40 is provided in the casing side wall 14 spaced rearwardly from yet substantially horizontally aligned with the hole 37. The purpose and function of the holes 37 and 40 will be made clear upon later detailed description of parts.

The second unit 11 of the device includes a stand 41, as is perhaps best shown in FIGS. 1 through 3. This stand 41 is substantially U-shaped having a base 42 and upstanding side walls 43 and 44.

In assembly of the first and second units 10 and 11 respectively, pivot pins 45, constituting a pivot means, are carried by the stand side walls 43 and 44 and are located in the pivot holes 37 provided in the casing side walls 14 and 15, whereby to pivot the casing 12 to the stand 41. A stop means interconnects the stand 41 and casing 12 to maintain the table 35 in predetermined angular positions. This stop means includes a plurality of spaced holes 46 in the stand side wall 43 arranged in an arc about the pivot pin 45. The compatible casing hole 40 is alignable with the stand holes 46 upon pivoting of the casing 12. A bolt 47, constituting a fastener, is selectively disposed in aligned casing and stand holes 40 and 46 to maintain the casing 12 and hence the table 35 in a predetermined angular position. For example, the bolt 47 maintains the casing 12 with the table 35 in a substantially vertical position in FIG. 1, with the table 35 in an inclined position in FIG. 2, and with the table 35 in a substantially horizontal position in FIG. 3.

FIG. 6 illustrates the use of the device in a welding lathe. In this assembly, a substantially T-shaped rail 50 is mounted on spaced blocks 51 that support the rail 50 above a supporting surface 52. The device 10-11 is mounted on a base 53 that is secured to the rail 50. The device 10-11 is disposed with the turntable 35 in its substantially vertical position and attached to one end of a workpiece such as a tank 54 to drive the tank 54 during welding operations. The device 10-11 in this assembly is a headstock. A tailstock 55 can be constructed similarly to the device 10-11, but is not powered, the turntable 56 merely serving as an idler. The tailstock 55 is mounted on a base 56 that is slidably attached to the rail 50.

FIG. 7 illustrates the use of the device 10-11 as a rotating driver only. In this assembly, the device 10-11 does not support the workpiece 60, but merely rotates it. For example, the workpiece 60 is supported on a pair of idler rolls 61 and 62. One end of the workpiece is attached by a universal joint 63 to a shaft 64 that is connected by a universal joint 65 to a chuck 66 mounted on the turntable 35.

FIG. 8 illustrates the use of the device 10-11 as a machine driver. For example, the shaft 67 of one pair of turning rolls 70 is drivingly connected by coupling 71 to the turntable 35. As is usual, the turning rolls can be utilized to support and rotate a workpiece.

We claim as our invention:

1. A device constituting a combined headstock, turntable, rotating driver and positioner, comprising:
   a. a first unit including:
      1. a casing,
      2. a power means carried solely by the casing, the power means having a driven shaft, and
      3. a table attached to and rotatable by the shaft,
   b. a second unit including:
      1. a stand,
      2. pivot means detachably connecting the casing to the stand for selectively pivoting the casing and hence the table to different angular positions, and
      3. stop means interconnecting the stand and casing to maintain the table in predetermined angular positions for use as a headstock, turntable, driver or positioner, and
   c. the casing of the first unit includes a base on which the first unit only is supported independent of the second unit when the pivot means is disconnected for use of the first unit only as a headstock or turntable or rotating driver.

2. A device as defined in claim 1, in which:
   d. the stand of the second unit includes a base and laterally spaced upstanding walls,
   e. the casing of the first unit is disposed between the spaced stand walls, and
   f. the pivot means detachably connects the casing of the first unit to the spaced stand walls of the second unit.

* * * * *